(12) United States Patent
Hashimoto et al.

(10) Patent No.: US 7,751,724 B2
(45) Date of Patent: Jul. 6, 2010

(54) OPTICAL MODULATOR

(75) Inventors: Yoshihiro Hashimoto, Tokyo (JP); Shingo Mori, Tokyo (JP); Norikazu Miyazaki, Tokyo (JP); Kaoru Higuma, Tokyo (JP); Toshio Sakane, Tokyo (JP)

(73) Assignee: Sumitomo Osaka Cement Co., Ltd. (JP)

( * ) Notice: Subject to any disclaimer, the term of this patent is extended or adjusted under 35 U.S.C. 154(b) by 697 days.

(21) Appl. No.: 11/624,887

(22) Filed: Jan. 19, 2007

(65) Prior Publication Data

US 2007/0195396 A1 Aug. 23, 2007

(30) Foreign Application Priority Data

Jan. 23, 2006 (JP) ............................. 2006-014200

(51) Int. Cl.
*H04B 10/04* (2006.01)
(52) U.S. Cl. ................. 398/183; 398/186; 398/188; 398/185; 398/187; 359/236; 359/237; 359/238; 359/245; 359/247; 385/1; 385/3
(58) Field of Classification Search .............. 398/182, 398/183, 184, 185, 186, 187, 188, 192, 193, 398/194, 195, 196, 197, 198, 199; 359/245, 359/326, 247, 248, 236, 237, 238; 385/1, 385/2, 3, 39, 40, 14, 15, 31
See application file for complete search history.

(56) References Cited

U.S. PATENT DOCUMENTS 6,525,857 B1 * 2/2003 Way et al. .................... 398/192

2004/0085620 A1 * 5/2004 Kawanishi et al. .......... 359/326
2004/0208436 A1 * 10/2004 Hakimi et al. ................ 385/27
2005/0286908 A1 * 12/2005 Way ............................ 398/186

FOREIGN PATENT DOCUMENTS

JP 2002-341299 11/2002
JP 2005-274806 10/2005

OTHER PUBLICATIONS

English Abstract of JP 2005-274806.
(Continued)

*Primary Examiner*—Hanh Phan
(74) *Attorney, Agent, or Firm*—Ostrolenk Faber LLP (57) ABSTRACT

An optical modulator is provided which includes: an optical splitting part that splits an input light wave into two light waves; two optical waveguides that propagate the two light waves into which the input light wave is split, respectively; a first SSB modulating part that is provided in one of the two optical waveguides and modulates a light wave, which propagates into the first SSB modulating part, with a carrier frequency so that the light wave is converted into a different light wave having a single side band; a second SSB modulating part that is provided in the other of the two optical waveguides and modulates a light wave, which propagates into the second SSB modulating part, with a data signal in order to generate a signal light wave having a different single side band; and an optical combining part that combines the light wave modulated by the first SSB modulating part with the signal light wave generated by the second SSB modulating part.

12 Claims, 7 Drawing Sheets

OTHER PUBLICATIONS

English Translation of JP 2005-274806.
Hashimoto et al., "A Study in Optical Modulation Index of Fiber-optic Terrestrial Digital Broadcasting Signal Distribution System based on mmW Self-heterodyne/Optical Heterodyne detection Technique", IEICE symposium, 2005.

English Translation of above article, 2005.
Office Action issued Mar. 16, 2010 on the counterpart Japanese Patent Application No. 2006-014200, with English Translation, 4 pages total.

* cited by examiner

| BROADCASTING | 3.5GHz (STL), 13GHz (TTL) |
| --- | --- |
| WIRELESS LAN | 23GHz, 40GHz, 60GHz |
| ITS (INTELLIGENT TRANSPORT SYSTEMS) | 5.8GHz |
| SATELLITE | 20~30GHz |

OPTICAL MODULATOR

CROSS REFERENCES TO RELATED APPLICATIONS

This application claims priority from Japanese Patent Application No. 2006-014200, filed on Jan. 23, 2006, the disclosure of which is incorporated herein by reference.

BACKGROUND OF THE INVENTION

1. Field of the Invention

The present invention relates to an optical modulator, and more particularly, to an optical SSB modulator that generates a modulation signal having a suppressed single side band.

2. Background Art

With the increased use of radio frequency resources in the microwave frequency band, frequencies used for various kinds of next-generation wireless systems have become higher and higher. However, such transference of wireless systems to higher frequency bands makes the coverage of one cell narrower, produces a blind area caused by a building shadow and the like due to the linearity of electromagnetic waves, and makes it difficult for electromagnetic waves to enter indoors.

Under such circumstances, a so-called optical fiber wireless system in which a radio signal is converted to an optical signal, and the optical signal is transmitted to a desired site with low loss through an optical fiber and is then again converted to electromagnetic waves at the site for wireless delivery has become increasingly important.

In such an optical fiber wireless system, since radio signals having different frequencies are transmitted through the optical fiber, there is a need for optical modulation over a wide range of frequencies (for example, see Japanese Unexamined Patent Application, First Publication No. 2005-274806). In addition, it has been considered that a SSB (Single Side Band) modulator that generates a modulation signal having a suppressed single side band could be used to prevent a signal from deteriorating due to dispersion of an optical fiber transmission line.

However, since a conventional SSB modulator performs SSB modulation with a wideband signal, which is a combination of an RF carrier and a data signal, it requires a wideband signal source.

In addition, it is commonly known that the modulation efficiency of a SSB modulator deteriorates in a high frequency domain. For the purpose of preventing such deterioration of the modulation efficiency, a modulator using a resonance electrode structure has been proposed which is effective in increasing modulation efficiency at a specific frequency. However, in the proposed modulator, an RF carrier frequency depends on the modulator structure. Accordingly, a plurality of modulators having different structures depending on RF carriers is required to be arranged.

In addition, a conventional SSB modulation system for adjusting a ratio of the carrier power to signal power in order to optimize a CN (carrier to noise) ratio after receipt (for example, see "Experimental study on an optimal optical modulation index in a millimeter wave self-heterodyne/optical heterodyne detection-based digital terrestrial delivery system, Hashimoto et al., The Institute of Electronics, Information and Communication Engineers (IEICE) symposium, 2005") also cannot obtain sufficient characteristics in a high frequency domain.

SUMMARY OF THE INVENTION

An advantage of the invention is that it provides an optical modulator which is capable of performing modulation with high efficiency over a wide frequency band ranging from a low frequency to a high frequency and adjusting a ratio of the carrier power to signal power randomly.

To achieve the above advantage, according to an aspect of the invention, there is provided an optical modulator including: an optical splitting part that splits an input light wave into two light waves; two optical waveguides that propagate the two light waves into which the input light wave is split, respectively; a first SSB modulating part that is provided in one of the two optical waveguides and modulates a light wave, which propagates into the first SSB modulating part, with a carrier frequency so that the light wave is converted into a different light wave having a single side band; a second SSB modulating part that is provided in the other of the two optical waveguides and modulates a light wave, which propagates into the second SSB modulating part, with a data signal in order to generate a signal light wave having a different single side band; and an optical combining part that combines the light wave modulated by the first SSB modulating part with the signal light wave generated by the second SSB modulating part.

Preferably, each of the first and second SSB modulating parts includes: two Mach-Zehnder interferometers; a modulation signal input part that inputs modulation signals having a phase difference of $\pi/2$ to the Mach-Zehnder interferometers for modulating phases of light waves which propagate into the Mach-Zehnder interferometers; and a phase difference applying part that applies a phase difference of $\pi/2$ or $-\pi/2$ to light waves outputted from the Mach-Zehnder interferometers.

Preferably, the data signal is directly inputted as the modulation signal to the second SSB modulating part.

Preferably, a signal, which is a combination of the data signal and an intermediate frequency signal, is inputted as the modulation signal to the second SSB modulating part.

Preferably, a carrier frequency signal generated from one signal source is divided into two signals, one being inputted to the first SSB modulating part and the other being combined with the data signal and then inputted to the second SSB modulating part.

Preferably, a phase adjusting part that adjusts a phase of a light wave is provided in at least one of the two optical waveguides.

Preferably, an intensity adjusting part that adjusts the intensity of a light wave is provided in at least one of the two optical waveguides.

According to the aspect of the invention, since the optical modulator includes the first SSB modulating part for performing the SSB modulation with the carrier frequency and the second SSB modulating part for performing the SSB modulation with the data signal, that is, since the optical modulator performs the carrier modulation and the data modulation separately using the respective first and second SSB modulating parts, it is possible to randomly change a carrier frequency signal used as a radio signal. In addition, it is possible to apply elements having narrow band frequency characteristics to a front stage in which the carrier signal and the data signal are combined, thereby operating the optical modulator with high efficiency over a wide frequency band.

In addition, it is possible to adjust a power ratio of the carrier light wave to signal light wave by means of the intensity adjusting part, thereby allowing modulation at an optimal CN ratio. In addition, it is possible to optimize a phase relationship between the carrier light wave and the signal light wave by means of the phase adjusting part, thereby suppressing detection efficiency from being lowered.

DESCRIPTION OF PREFERRED EMBODIMENTS

Hereinafter, preferred embodiments of the invention will be described in detail with reference to the accompanying drawings.

In the following description, "optical waveguide" is simply referred to as "waveguide".

Figure 1A:
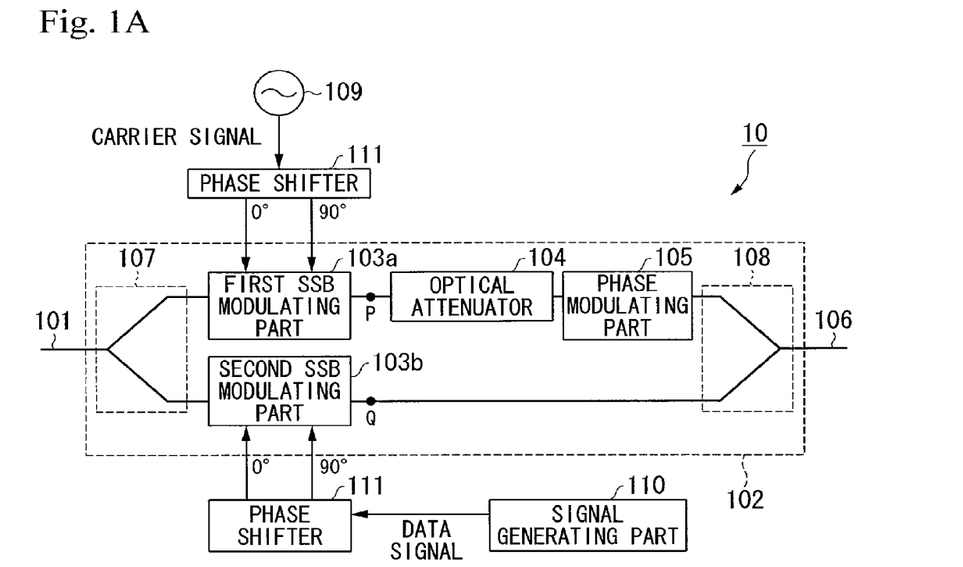
FIGS. 1A and 1B are views showing a configuration of an optical modulator according to one embodiment of the invention.
Figure 1B:
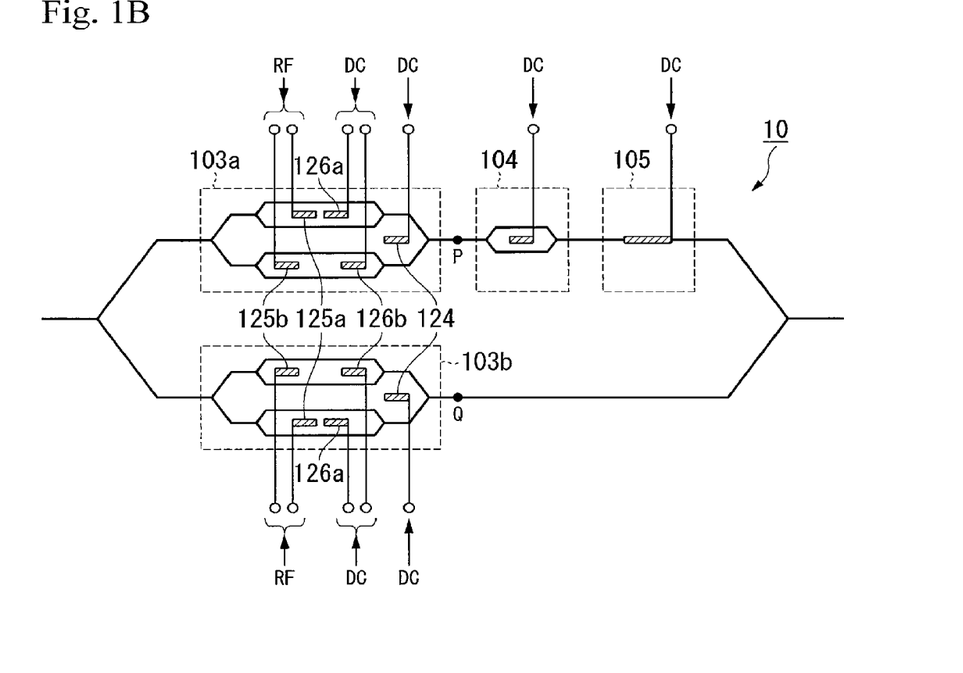

FIGS. 1A and 1B are views showing a configuration of an optical modulator 10 according to one embodiment of the invention. FIG. 1A shows functional blocks of the optical modulator 10 and FIG. 1B shows a configuration of waveguides and electrodes. As shown in FIG. 1A, the optical modulator 10 includes an input waveguide 101, a first main Mach-Zehnder waveguide 102, a first SSB modulating part 103a provided at one arm of the first main Mach-Zehnder waveguide 102, an optical attenuator (intensity adjusting part) 104 and a phase modulating part (phase adjusting part) 105, both of which are provided at a rear side of the first SSB modulating part 103a, a second SSB modulating part 103b which is provided at the other arm of the first main Mach-Zehnder waveguide 102, an output waveguide 106, Y-shaped branch waveguides (optical splitting part and optical combining part) 107 and 108 that connect the first main Mach-Zehnder waveguide 102 to the input waveguide 101 and the output waveguide 106, respectively, an RF carrier generating part 109, a signal generating part 110, and two phase shifters 111.

A light wave inputted to the input waveguide 101 is split into two light waves by the Y-shaped branch waveguide (optical splitting part) 107. The two light waves are introduced into the respective arms of the first main Mach-Zehnder waveguide 102 and then are inputted to the first SSB modulating part 103a and the second SSB modulating part 103b, respectively. The first SSB modulating part 103a modulates the light wave inputted thereto with an RF carrier frequency from the RF carrier generating part 109 and the second SSB modulating part 103b modulates the light wave inputted thereto with a data signal from the signal generating part 110. The phase shifters 111 are used to provide predetermined phases to modulation signals. The optical attenuator 104 adjusts the intensity of the light wave modulated by the first SSB modulating part 103a and the phase modulating part 105 adjusts the phase of the modulated light wave, the intensity of which was adjusted by the optical attenuator 104. The modulated light wave outputted from the phase modulating part 105 and the modulated light wave outputted from the second SSB modulating part 103b are combined in the Y-shaped branch waveguide (optical combining part) 108 and then are outputted to the output waveguide 106.

Figure 2:
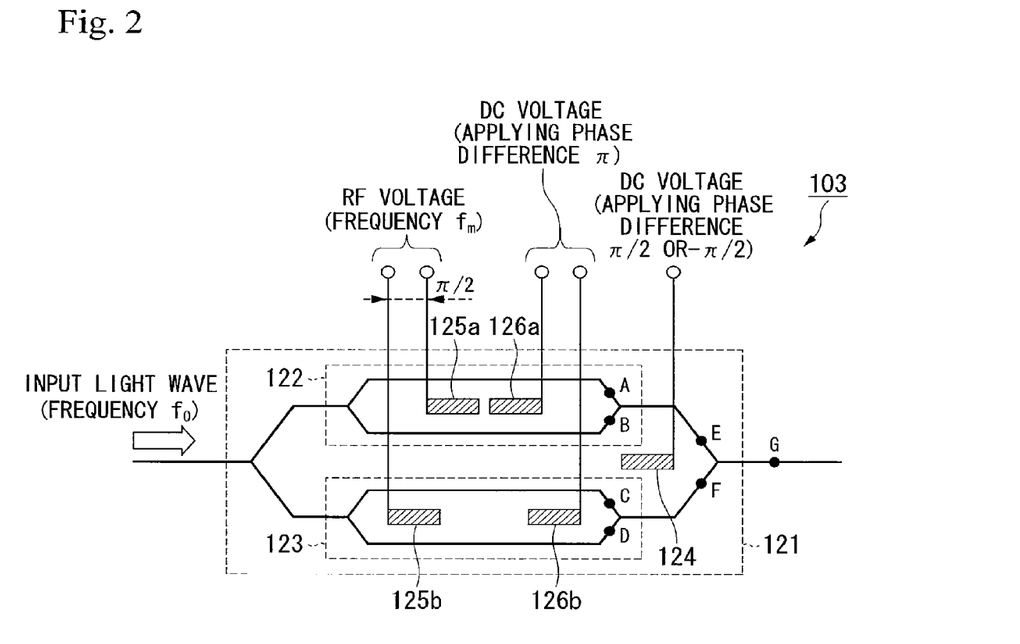
FIG. 2 is a view showing a configuration of a SSB modulating unit.

FIG. 2 is a view showing a configuration of the first SSB modulating part 103a and the second SSB modulating part 103b (hereinafter collectively referred to as a SSB modulating part 103). The SSB modulating part 103 has a waveguide structure in which first and second sub Mach-Zehnder waveguides (Mach-Zehnder interferometers) 122 and 123 are respectively arranged in arms of a second Mach-Zehnder waveguide 121. In addition, electrodes 124 to 126 (an earth electrode is not shown in FIG. 2 for the purpose of simplification) for changing phases of propagating light waves by application of a voltage are loaded on the main and sub Mach-Zehnder waveguides 121 to 123, respectively.

A light wave having a frequency of $f_0$ is inputted to the second main Mach-Zehnder waveguide 121. The inputted light wave is split into two light waves which are then introduced into the first and second sub Mach-Zehnder waveguides 122 and 123, respectively, in which phases of the light waves are changed. The light waves that have passed through the first and second sub Mach-Zehnder waveguides 122 and 123 are combined and outputted.

A DC voltage is applied to a DC electrode 126a on the first sub Mach-Zehnder waveguide 122 so that a phase difference between light waves introduced into arms of the first sub Mach-Zehnder waveguide 122 becomes π, and an RF voltage having a modulation frequency of $f_m$ is applied to an RF electrode 125a of the first sub Mach-Zehnder waveguide 122. In addition, the same DC voltage is applied to a DC electrode 126b on the second sub Mach-Zehnder waveguide 123, and an RF voltage having a modulation frequency of $f_m$ adjusted by the phase shifter 111 (not shown in FIG. 2) is applied to an RF electrode 125b so that a phase difference between the RF electrode 125a and the RF electrode 125b becomes π/2. In addition, a DC voltage is applied to an electrode 124 on the second main Mach-Zehnder waveguide 121 so that a phase difference between the first and second sub Mach-Zehnder waveguides 122 and 123 becomes π/2 or −π/2.

Figure 3:
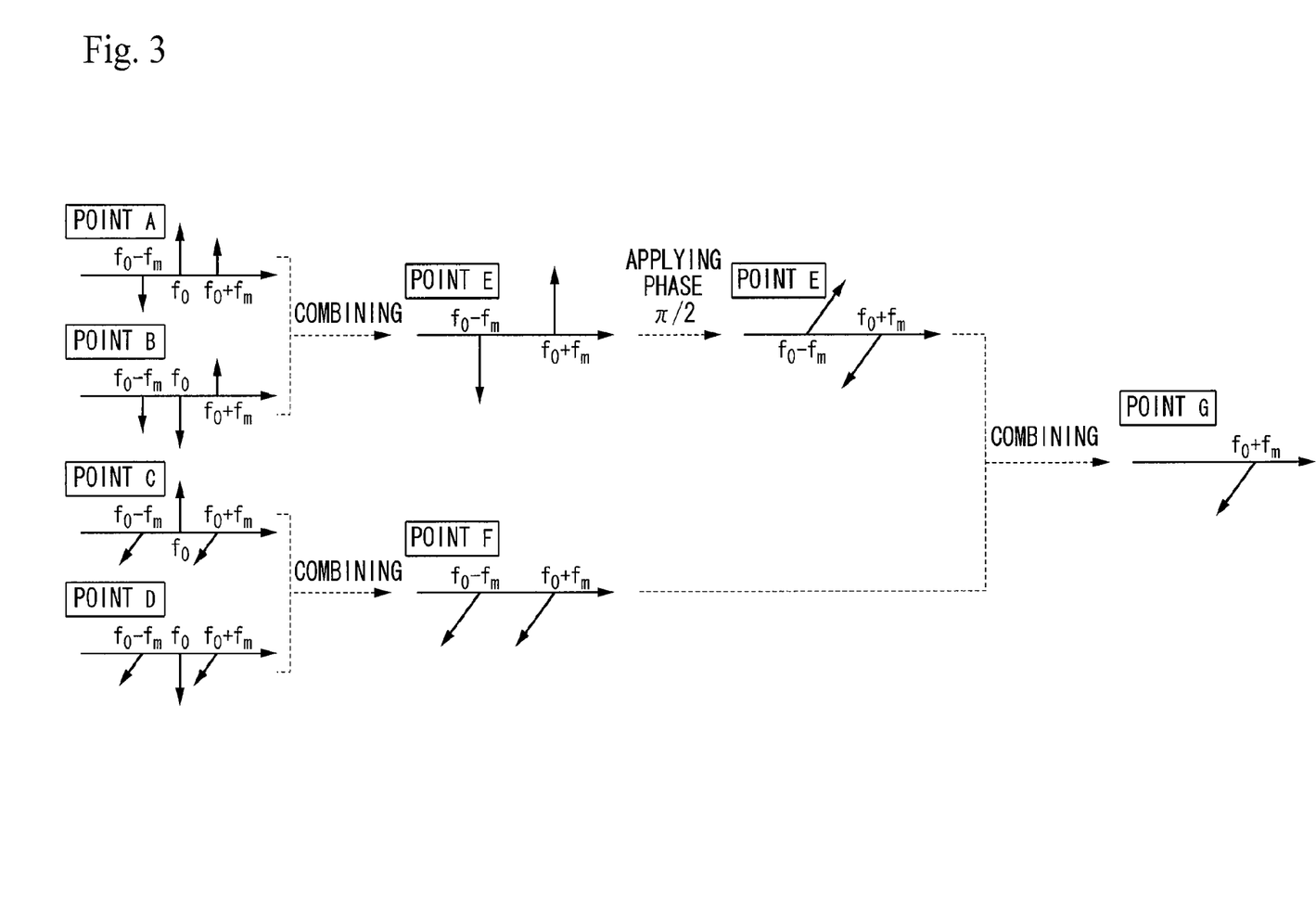
FIG. 3 is a view showing the behavior of a frequency spectrum and a phase of a light wave in the SSB modulating unit.

Now, a basic operation of the SSB modulating part 103 will be described. FIG. 3 shows a frequency spectrum and a phase of a light wave at each of points (points A to G in FIG. 2) of waveguides of the SSB modulating part 103. Here, a phase difference of a light wave by the DC voltage of the electrode 124 is assumed to be π/2. In FIG. 3, a horizontal axis represents a frequency. In addition, arrows on the frequency axis represent a frequency spectrum and directions of the arrows represent phases. For phase values, an upward arrow is assumed to be π, a right-inclined upward arrow is assumed to be π/2, a downward arrow is assumed to be π, and a left-inclined downward arrow is assumed to be 3π/2.

In FIG. 3, carrier light waves (having a frequency of $f_0$) at points A and B are in a reversed phase relationship (that is, a phase difference of π) due to the DC voltage applied to the DC electrode 126a. In addition, with the phase modulation with the RF voltage of the frequency of $f_m$, high frequency components are produced at intervals of the frequency fm around the frequency $f_0$ of the carrier light waves. Here, only "± first order" frequency components will be considered in no consideration of second order and higher frequency components. In this case, a "+ first order" modulated light wave (having a frequency $f_0+f_m$) at the point A and a "− first order" modulated light wave (having a frequency $f_0-f_m$) at the point B are in phase (that is, a phase difference of 0).

When the propagating light waves having such a phase relationship at the points A and B on the arms of the first sub Mach-Zehnder waveguide 122 are combined at the point E, the carrier light waves in the reversed phase relationship cancel each other out, leaving only "± first order" modulation components.

In addition, the propagating light waves at the points C and D on the arms of the second sub Mach-Zehnder waveguide 123 have the same phase relationship as the propagating light waves at the points A and B. Accordingly, only "± first order" modulation components are left.

In addition, as shown in FIG. 3, at the points E and F, the "+ first order" modulated light waves are in phase while the "− first order" modulated light waves are in a reversed phase relationship. As a result, the combined light waves have only the "+ first order" modulation component at the point G at an output side of the second main Mach-Zehnder waveguide 121. In addition, when the phase difference between the light waves by the DC voltage of the electrode 124 is assumed to be −π/2, only the "− first order" modulation component is left at the point G.

In this manner, the output of the SSB modulating part 103 has a frequency spectrum of a single side band, with the carrier light wave and one side band being suppressed. Whether the single side band lies in a "+ side" or a "− side" may be determined by the DC voltage applied to the electrode 124.

Retuning to FIG. 1B showing the overall configuration of the optical modulator 10, a further description of the optical modulator 10 will be given (the earth electrode is not shown in FIG. 1B).

In the first SSB modulating part 103a, as described above, the DC voltage is applied to the DC electrodes 126a and 126b on the sub Mach-Zehnder waveguides, the RF voltage having the frequency $f_m$ is applied to the RF electrodes 125a and 125b, and the DC voltage having the phase difference −π/2 is applied to the electrode 124 on the main Mach-Zehnder waveguide. On the other hand, in the second SSB modulating part 103b, as described above, the DC voltage is applied to the DC electrodes 126a and 126b, the modulation voltage by the data signal instead of the RF signal is applied to the RF electrodes 125a and 125b, and the DC voltage having the phase difference π/2 is applied to the electrode 124.

Figure 4A:
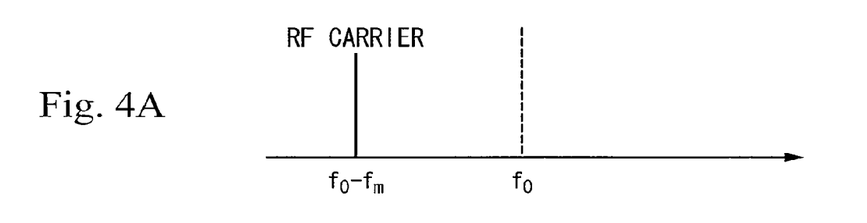
FIGS. 4A, 4B and 4C show frequency spectrums of a light wave in the optical modulator shown in FIGS. 1A and 1B.
Figure 4B:
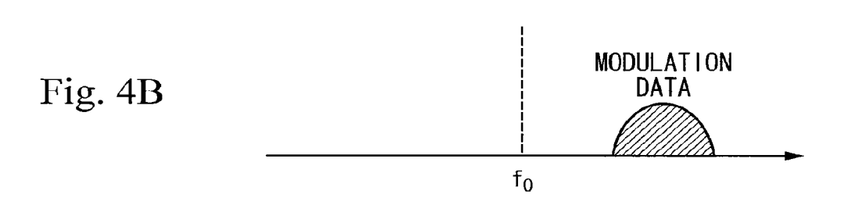
Figure 4C:
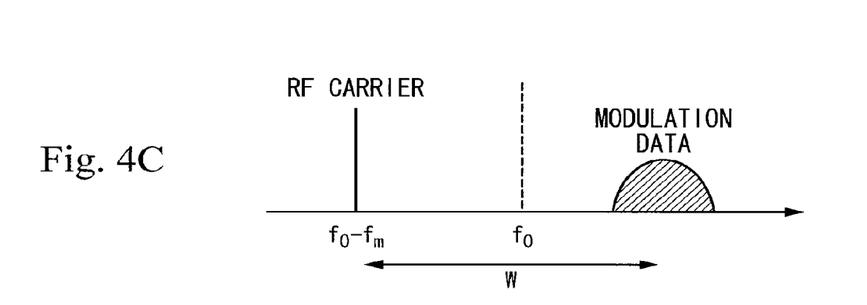

Then, frequency spectrums of the light waves at output terminals (the point P and Q in FIGS. 1A and 1B) of the first SSB modulating part 103 and the second SSB modulating part 103b, respectively, are as shown in FIGS. 4A and 4B, respectively. As shown in FIGS. 4A and 4B, the output from the first SSB modulating part 103a has a single frequency spectrum corresponding to the modulation frequency $f_m$ while the output from the second SSB modulating part 103b has a spread frequency spectrum corresponding to the modulation by the data signal. In addition, since the DC voltage applied to the electrode 124 has the reversed phase, single side bands outputted from the two SSB modulating parts are opposite ("+ side" and "− side") to each other. Alternatively, the optical modulator 10 may be also operated by causing single side bands outputted from the two SSB modulating parts to appear at the same side, with an application of a voltage to the electrode 124 in phase.

At this time, assuming that powers of the light waves introduced into the output waveguide 106 from the first SSB modulating part 103a and the second SSB modulating part 103b are $P_1$ and $P_2$, respectively, and a phase difference between these light waves is Δφ, the demodulation efficiency of the data signal from an output light wave of the optical modulator 10 may be represented by $P_1 \cdot P_2 \cdot \cos \Delta\phi$. The optical attenuator 104 and the phase modulating part 105, which are provided at a rear stage of the first SSB modulating part 103a, adjust the intensity and the phase of the output light wave from the first SSB modulating part 103a, respectively, so that conditions of $P_1=P_2$ and Δφ=0 are satisfied.

In this embodiment, in the optical modulator 10, the optical attenuator 104 is configured by a Mach-Zehnder waveguide and a DC electrode and adjusts (attenuates) light intensity by controlling a DC voltage applied to the DC electrode. In addition, the phase modulating part 105 has a DC electrode loaded on a straight waveguide and makes a desired phase change of a propagating light wave by controlling a DC voltage like the optical attenuator 104.

When the light waves that underwent the SSB modulation by the RF frequency and the data signal and the adjustment of the light intensity and the phase are introduced into and combined in the output waveguide 106, the frequency spectrum of the combined light waves is as shown in FIG. 3C.

Figure 5:
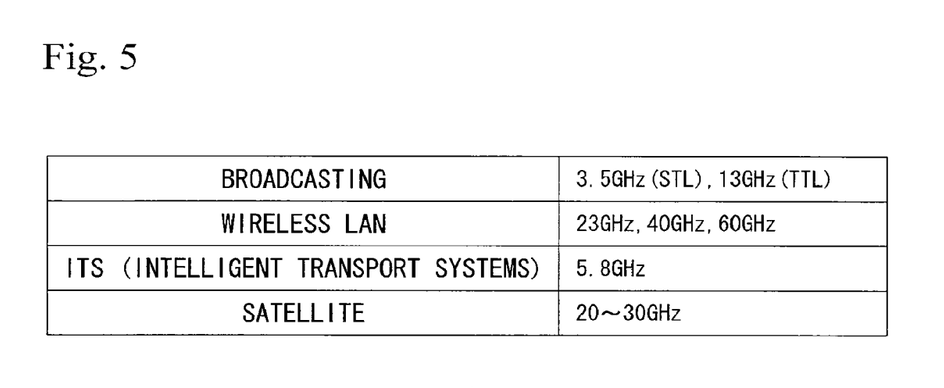
FIG. 5 is a table showing examples of frequencies W for various uses.

Here, when a value of the RF frequency $f_m$ is appropriately selected, a frequency W of the data signal based on an RF carrier (having a frequency $f_0-f_m$) can be changed randomly. In this case, the data signal is not affected. That is, the optical modulator 10 can select an RF frequency independent of the data signal. FIG. 5 shows examples of frequencies W for various uses.

Figure 6:
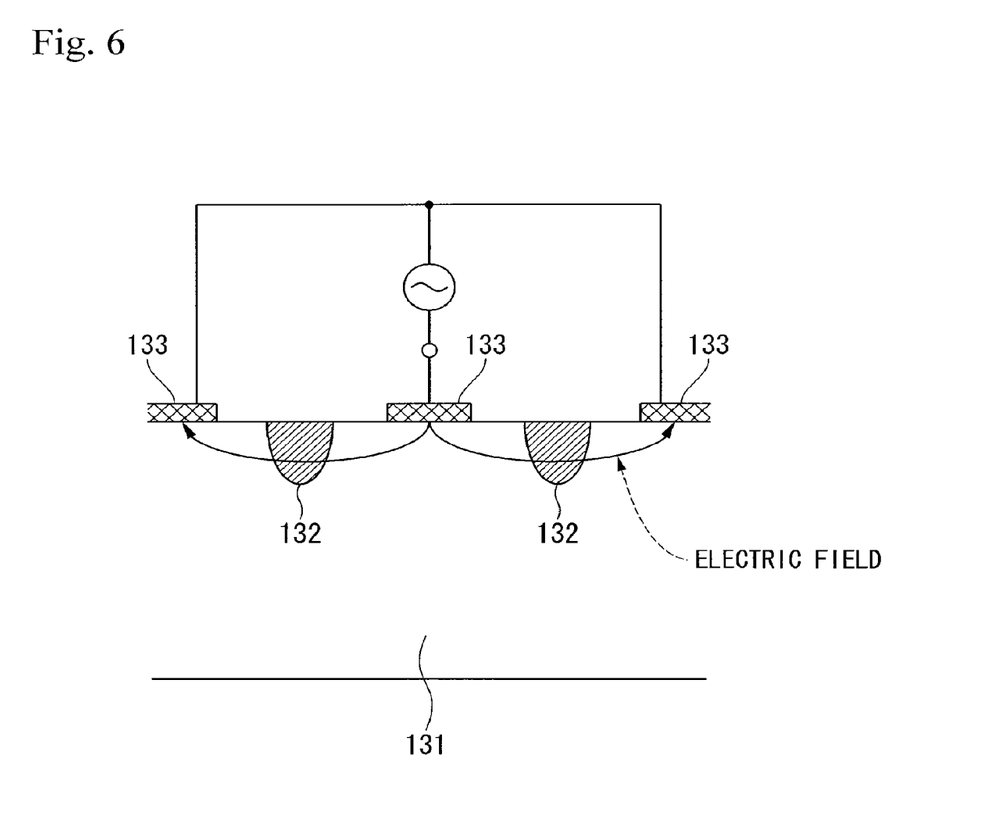
FIG. 6 is a structural view showing a sectional structure of an optical waveguide in the optical modulator shown in FIGS. 1A and 1B.

FIG. 6 is a structural view showing a sectional structure of the optical waveguides in the optical modulator 10. Lithium niobate ($LiNbO_3$; LN) is used as a ferroelectric crystal having the above-described optical effect for a substrate 131. In addition, an X-cut LN substrate is employed as the substrate 131 in order to simplify wiring of electrodes 133. Waveguides 132 are formed by thermally diffusing titanium (Ti) into the substrate 131. The electrodes 133 are formed by plating gold (Au) on the substrate 131. In addition, the sectional view of FIG. 6 shows arms of Mach-Zehnder waveguides, and the arms are arranged at middle portions between the electrodes 133 so that an applied electric field is evenly applied to the waveguides of two arms.

In this manner, according to this embodiment, in the first SSB modulating part 103a, the modulation with the RF carrier frequency $f_m$ is performed in the sub Mach-Zehnder waveguides 122 and 123 while the phase difference of −π/2 is applied to the main Mach-Zehnder waveguide 121, and, in the second SSB modulating part 103b, the modulation with the data signal is performed in the sub Mach-Zehnder waveguides 122 and 123 while the phase difference of π/2 is applied to the main Mach-Zehnder waveguide 121. As a result, the light wave (carrier light wave) outputted from the first SSB modulating part 103a and the light wave (signal light wave) outputted from the second SSB modulating part 103b have respective single side bands at sides opposite to each other. In this way, the carrier signal and the data signal are separately produced in the optical modulator 10. This makes it possible to randomly adjust the RF carrier frequency $f_m$ in the first SSB modulating part 103a in correspondence to various radio frequencies.

In this embodiment, in addition to the independent performance of the carrier modulation and the data modulation, the intensity and the phase of the output light wave from the first SSB modulating part 103a are controlled by the optical attenuator 104 and the phase modulating part 105. This makes it possible to randomly adjust a ratio of the carrier power to signal power.

Although the embodiment of the invention has been described in detail with reference to the drawings, the invention is not limited to the above-described embodiment but may be changed in design in various ways without departing from the spirit and scope of the invention.

Figure 7:
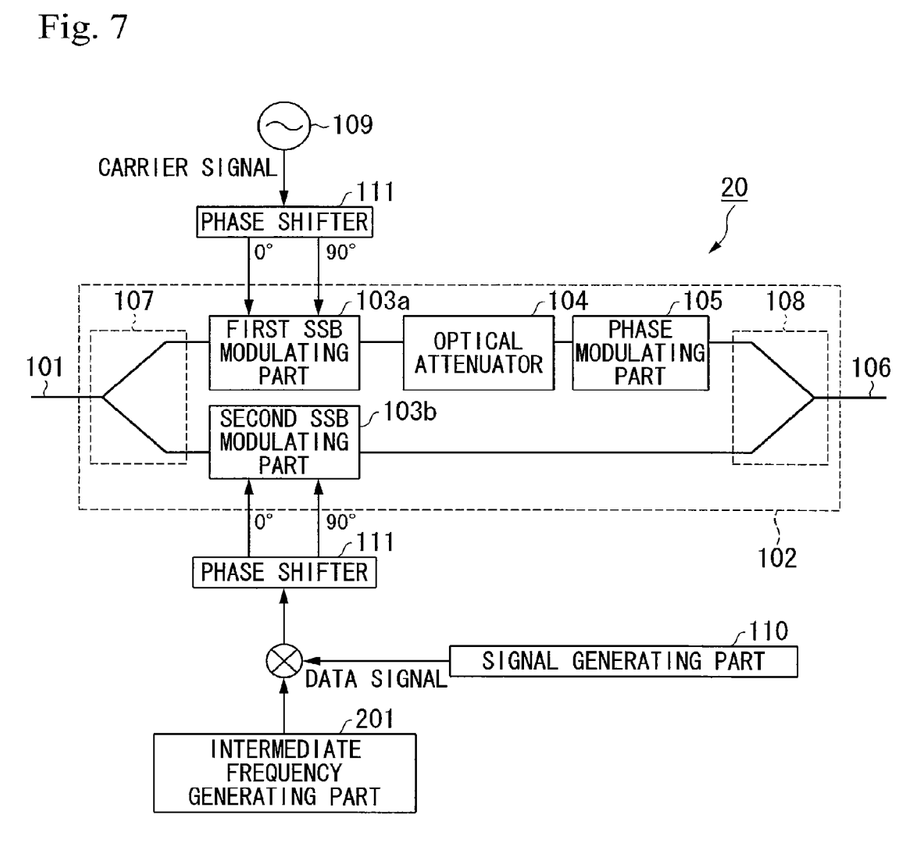
FIG. 7 is a view showing a configuration of an optical modulator according to another embodiment of the invention.
Figure 8:
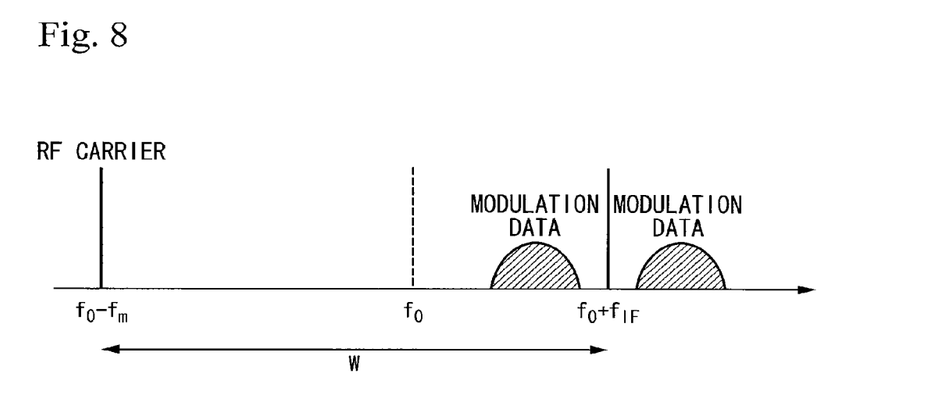
FIG. 8 shows a frequency spectrum of a light wave in the optical modulator shown in FIG. 7.

For example, as an optical modulator 20 shown in FIG. 7, it may be configured such that an intermediate frequency generating part 201 is newly added to the optical modulator shown in FIGS. 1A and 1B and the second SSB modulating part 103b is operated by combining the data signal from the signal generating part 110 with an intermediate frequency $f_{IF}$ generated by the intermediate frequency generating part 201. In this case, the frequency spectrum of the output light wave from the second SSB modulating part 103b, as shown in FIG. 4B, has a form as shown in FIG. 8. That is, in the optical modulator 20, the single side band generated by the second SSB modulating part 103b includes a single spectrum of a frequency $f_0+f_{IF}$ corresponding to the modulation by the intermediate frequency $f_{IF}$ and a modulation spectrum by the data signal appearing at both sides of the frequency $f_0+f_{IF}$.

Figure 9:
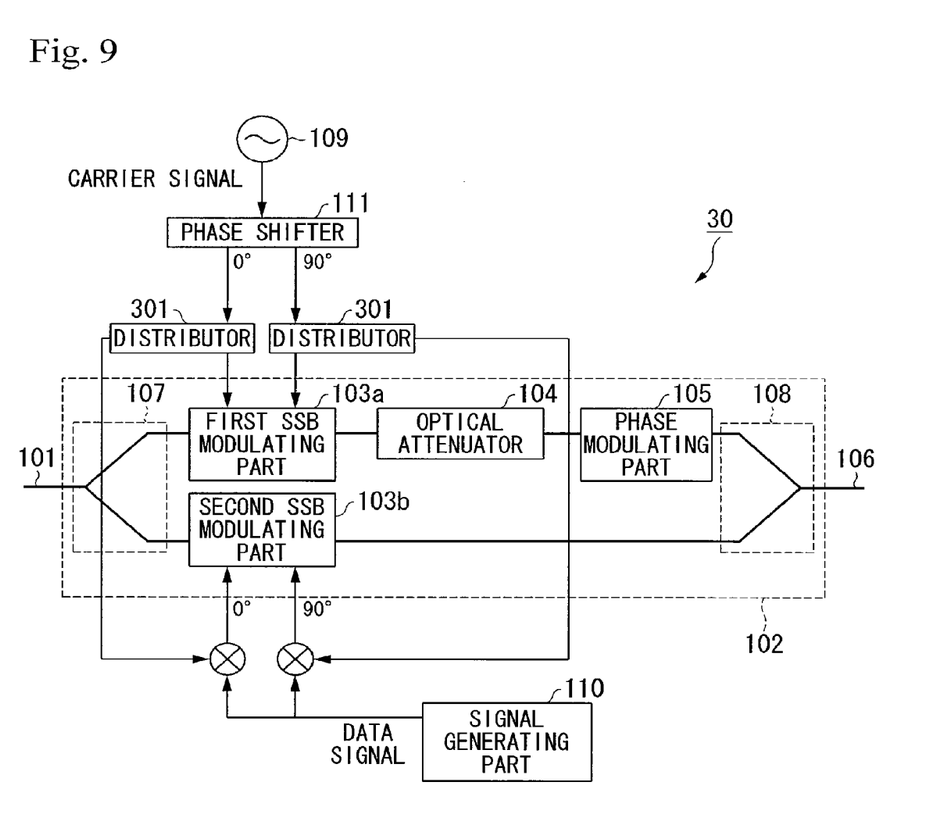
FIG. 9 is a view showing a configuration of an optical modulator according to still another embodiment of the invention.
Figure 10:
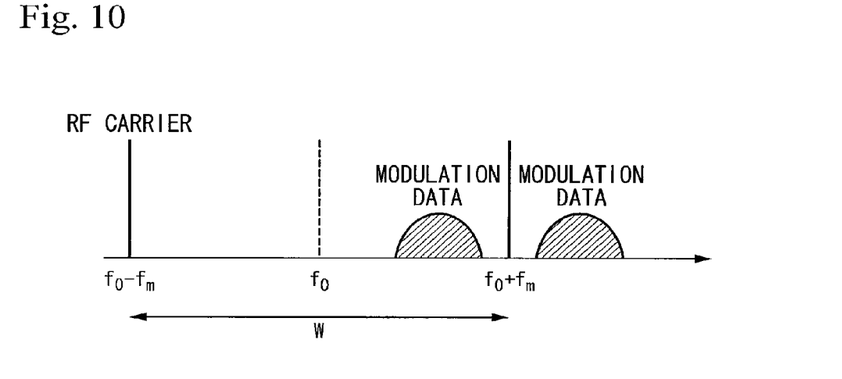
FIG. 10 shows a frequency spectrum of a light wave in the optical modulator shown in FIG. 9.

In addition, as an optical modulator 30 shown in FIG. 9, one phase shifter 111 may be shared by the two SSB modulating parts. That is, the RF signal from the RF carrier generating part 109 is distributed by distributors 301 and then is inputted to the SSB modulating part 103a and the second SSB modulating part 103b. For the second SSB modulating part 103b, the distributed RF signal and the data signal from the signal generating part 110 are combined and inputted to the second SSB modulating part 103b. As a result, in the optical modulator 30, the single side band generated by the second SSB modulating part 103b includes a single spectrum corresponding to the RF frequency and a modulation spectrum by the data signal appearing at both sides of the RF frequency, as shown in FIG. 10. This configuration has a merit in lowering product costs since it needs only one phase shifter 111.

In addition, arrangement locations of the optical attenuator 104 and the phase modulating part 105 are not limited to a rear stage of the first SSB modulating part 103a. Alternatively, the optical attenuator 104 and the phase modulating part 105 may be arranged at a front stage of the first SSB modulating part 103a or an arm of the second SSB modulating part 103b. In addition, one of the optical attenuator 104 and the phase modulating part 105 may be arranged at an arm of the first SSB modulating part 103a, and the other may be arranged at the arm of the second SSB modulating part 103b, or the optical attenuator 104 and the phase modulating part 105 may be overlappingly arranged at both arms of the first and second SSB modulating parts 103a and 103b. In addition, one of either of the optical attenuator 104 and the phase modulating part 105 may be omitted, but in this case, modulation efficiency may be lowered.

In addition, although the optical modulator has been illustrated as a waveguide device formed on the LN substrate in this embodiment, the optical modulator may be a modulator of a waveguide type other than the LN type, for example, an EA (electroabsorption effect) modulator using a semiconductor substrate. Also, in addition to the waveguide type optical parts, different bulk type optical parts may be used.

In addition, when the SSB modulating part 103 performs the modulation operation, a bias voltage may be applied to each of the electrodes in order to adjust an operating point.

What is claimed is:

1. An optical modulator comprising:
an optical splitting part that splits an input light wave into two light waves;
two optical waveguides that propagate the two light waves into which the input light wave is split, respectively;
a first Single Side Band (SSB) modulating part that is provided in one of the two optical waveguides and modulates a light wave, which propagates into the first SSB modulating part, with a carrier frequency so that the light wave is converted into a different light wave having a single side band;
a second SSB modulating part that is provided in the other of the two optical waveguides and modulates a light wave, which propagates into the second SSB modulating part, with a data signal in order to generate a signal light wave having a different single side band; and
an optical combining part that combines the light wave modulated by the first SSB modulating part with the signal light wave generated by the second SSB modulating part.

2. The optical modulator according to claim 1,
wherein each of the first and second SSB modulating parts includes:
two Mach-Zehnder interferometers;
a modulation signal input part that inputs modulation signals having a phase difference of $\pi/2$ to the Mach-Zehnder interferometers for modulating phases of light waves which propagate into the Mach-Zehnder interferometers; and
a phase difference applying part that applies a phase difference of $\pi/2$ or $-\pi/2$ to light waves outputted from the Mach-Zehnder interferometers.

3. The optical modulator according to claim 2,
wherein the data signal is directly inputted as the modulation signal to the second SSB modulating part.

4. The optical modulator according to claim 2,
wherein a signal, which is a combination of the data signal and an intermediate frequency signal, is inputted as the modulation signal to the second SSB modulating part.

5. The optical modulator according to claim 2,
wherein a carrier frequency signal generated from one signal source is divided into two signals, one being inputted to the first SSB modulating part and the other being combined with the data signal and then inputted to the second SSB modulating part.

6. The optical modulator according to claim 2,
wherein a phase adjusting part that adjusts a phase of a light wave is provided in at least one of the two optical waveguides.

7. The optical modulator according to claim 2,
wherein an intensity adjusting part that adjusts intensity of a light wave is provided in at least one of the two optical waveguides.

8. The optical modulator according to claim 1,
wherein the data signal is directly inputted as the modulation signal to the second SSB modulating part.

9. The optical modulator according to claim 1,
wherein a signal, which is a combination of the data signal and an intermediate frequency signal, is inputted as the modulation signal to the second SSB modulating part.

10. The optical modulator according to claim 1,
wherein a carrier frequency signal generated from one signal source is divided into two signals, one being inputted to the first SSB modulating part and the other being combined with the data signal and then inputted to the second SSB modulating part.

11. The optical modulator according to claim 1, wherein a phase adjusting part that adjusts a phase of a light wave is provided in at least one of the two optical waveguides.

12. The optical modulator according to claim 1, wherein an intensity adjusting part that adjusts intensity of a light wave is provided in at least one of the two optical waveguides.

* * * * *